United States Patent [19]
Muto

[11] Patent Number: 5,768,470
[45] Date of Patent: Jun. 16, 1998

[54] METHOD AND APPARATUS FOR REPRODUCING DATA IN RESPONSE TO HEADER INFORMATION

[75] Inventor: Akihiro Muto, Tokyo, Japan

[73] Assignee: Sony Corporation, Tokyo, Japan

[21] Appl. No.: 575,598

[22] Filed: Dec. 20, 1995

[30]     Foreign Application Priority Data

Dec. 28, 1994   [JP]   Japan .................................. 6-328378

[51] Int. Cl.⁶ ................................................ H04N 5/76
[52] U.S. Cl. ................................ 386/111; 386/125
[58] Field of Search ........................ 386/109, 111, 386/125, 124, 68, 112, 98, 95; H04N 5/76

[56]           References Cited

U.S. PATENT DOCUMENTS 5,477,516   12/1995   Takezawa .................................. 369/48
5,504,585   4/1996    Fujinami et al. ......................... 386/111
5,535,008   7/1996    Yamagishi et al. ...................... 386/109
5,596,564   1/1997    Fukushima et al. ...................... 386/111

*Primary Examiner*—Thai Tran
*Assistant Examiner*—Huy Nguyen
*Attorney, Agent, or Firm*—Frommer Lawrence & Haug LLP; William S. Frommer

[57]           ABSTRACT

A method and apparatus for reproducing data by optically reading out recorded signals from a recording medium. An encoded data decoding unit 4 separates header data from data read out from an optical disc 1. The header data information is sent to a controller 6. The controller calculates the value of the readout data quantity which permits data reproduction, decides the readout patterns of the encoded data and controls data transfer from an encoded data decoding unit 4 to a decoder 5. For special reproduction of variable length encoded data, an optimum readout pattern may be partially selected from the encoded data without causing disorder in the data supply to the decoder.

6 Claims, 4 Drawing Sheets

METHOD AND APPARATUS FOR REPRODUCING DATA IN RESPONSE TO HEADER INFORMATION

BACKGROUND OF THE INVENTION

This invention relates to a method and apparatus for reproducing data by optically reading out recorded signals from a recording medium.

In view of the voluminous quantity of the information of moving picture data, means for encoding picture signals by high efficiency encoding, recording the encoded signals, reading out the recorded signals and decoding the read-out signals with high efficiency becomes indispensable for recording the information for a prolonged time. For meeting such demand, there are proposed high efficiency encoding systems which take advantage of the correlation of picture signals. One of these high efficiency encoding systems is the MPEG (Moving Picture Experts Group) system.

With the MPEG system, the difference between picture frames of picture signals is found by exploiting the inter-frame correlation for decreasing the redundancy along time axis, and subsequently the processing such as discrete cosine transform (DCT) is executed by exploiting line correlation for decreasing the redundancy along the spatial axis, for efficiently encoding picture signals.

With the MPEG system, the respective frame pictures are processed as intra-coded pictures (I-pictures), predictive-coded pictures (P-pictures) or bi-directionally predictive-coded pictures (B-pictures) for encoding the picture signals for data compression.

If an optical disc for optically recording/reproducing the encoded picture signals is employed as a recording medium for recording the encoded picture signals, a data reproducing apparatus for reading out and reproducing signals recorded on the optical disc employs an optical pickup for optically reading out the signals. This optical pickup has laser outputting means in the form of e.g., a laser diode for condensing and illuminating a laser light beam from the laser outputting means on the optical disc and for receiving the light reflected from the optical disc for detecting RF signals. The RF signals are processed and converted into bi-level signals for producing encoded data.

For decoding the encoded data, a decoder variable-length decodes and dequantizes the encoded data. The decoded data is further inverse DCTed to produce decoded frame picture data. The decoded data is processed with motion compensation for each picture and resulting picture data is sequentially outputted on the frame basis.

When it is necessary to output and display a fixed quantity of data at a pre-set timing, as in the case of the abovementioned moving picture data, it is necessary to transfer a required amount of data to the decoder and to complete the decoding therein within a pre-set time interval. However, if the picture data is variable-length decoded, it is likely that the transfer rate of the encoded data momentarily becomes higher than the mean transfer rate. However, the picture data is encoded so that, if, even in such case, the data is being reproduced in the usual manner, the decoding operation by the decoder will not fall into disorder. The data reproducing apparatus is similarly so designed that, in such case, its signal processing will not fall into disorder.

Meanwhile, since the above-described data reproducing apparatus is configured for performing the usual data reproducing operation, it is likely that supply of the encoded data falls into disorder if the data reproducing apparatus performs a special playback operation such as one reading out the variably encoded picture data at random.

Specifically, if a large quantity of encoded data is continuously supplied to the decoder, the mean transfer rate of the encoded data is increased. On the other hand, if data is read out from discrete zones of the recording area of an optical disc as a recording medium so as to be supplied to the decoder, data seek time is involved. In these cases, signal processing such as signal decoding tends to fall into disorder.

In addition, since the identification information specifying the detailed data information is not contained in the encoded data configuration available at the present stage, it is not possible with the data reproducing apparatus to perform flexible special reproduction. Specifically, for reading the encoded data in the reverse direction by way of such special reproduction, the varying speed reproduction of the frame picture data only of the I-picture is currently feasible.

OBJECT AND SUMMARY OF THE INVENTION

It is therefore an object of the present invention to provide s data reproducing method and apparatus which does not fall into disorder in processing the encoded data and which is capable of performing flexible special reproduction.

In one aspect, the present invention provides a data reproducing device including read-out means for reading out the header information and encoded data succeeding to the header information from a recording medium, control means for controlling the readout of the encoded data in dependence upon the data reproducing rate and/or data reproducing direction, decoding means for decoding the read-out encoded data, and outputting means for outputting the decoded data.

Preferably, the header information and the encoded data succeeding the header information are grouped in pre-set units.

Preferably, the encoded data includes at least intra-picture coded data and forward predictive-coded data.

Preferably, the encoded data further includes bi-directional predictive-coded data.

Preferably, the control means includes first decision means for deciding the encoded data to be read out in dependence upon the data reproducing rate and/or data reproducing direction.

Preferably, the second decision means includes detection means for detecting the sorts and the quantity of encoded data from the header information, and third decision means for deciding the encoded data to be read out from the readable data responsive to a detection output of the detection means.

Preferably, the third decision means includes storage means for storing plural encoded data readout patterns, and selection meas for selecting one of the readout patterns responsive to the detection output of the detection means.

Also preferably, the decoding means selectively decodes the intra-picture encoded data and the forward predictive-coded data.

In another aspect, the present invention provides a data reproducing method including the steps of reading out the header information and encoded data succeeding to the header information from a recording medium, controlling the readout of the encoded data in dependence upon the data reproducing rate and/or data reproducing direction, decoding the read-out encoded data, and outputting the decoded data.

According to the present invention, in which encoded data comprised of plural frames and the header information as the subsidiary information for the encoded data are sequentially read out by signal read-out means, the encoded data and the header information are separated from each other by data decoding means and a pattern of the encoded data is read out by the data decoding means using the separated header information and subsequently transferred to the decoding means under control by control means, optimum special reproducing patterns which does not disrupt data supply may be selected in partial units.

The encoded data is produced by a high efficiency encoding method which effects encoding into intra-frame encoded pictures, forward predictive-coded pictures and bi-directionally predictive-coded pictures. At least one intra-frame coded picture is present in a block unit comprised of the encoded data of the picture information of plural frames and the subsidiary information for the encoded data. The header information indicates the types and the quantity of the encoded data in the respective frames at least on the block basis in order to permit special reproduction of moving picture data.

On the other hand, the data quantity of the block-based encoded data is calculated using the header information, a pattern of the encoded data having a transfer rate slower than the decoding rate of the decoding means is selected and part or all of the encoded data in the block unit is transmitted from the encoded data decoding means to the decoder for carrying out decoding corresponding to the special reproduction.

In sum, in the data reproducing device according to the present invention, optimum readout patterns can be partially selected from the encoded data without disrupting data supply to the decoding means on the occasion of special reproduction of variable length encoded data. Since the data construction can be grasped before being transmitted to the decoding means, it is up to the decoding means to read out only data required for data reproduction, thus lowering the data transfer rate. In addition, since the reproducible data readout patterns are selected, it becomes possible to prohibit the disruption of the data reproduction other than the disruption caused by irregular errors.

The encoded data is produced by a high efficiency encoding method which effects encoding into intra-frame encoded pictures, forward predictive-coded pictures and bi-directionally predictive-coded pictures. At least one intra-frame coded picture is present in a block unit comprised of the encoded data of the picture information of plural frames and the subsidiary information for the encoded data. The header information indicates the types and the quantity of the encoded data in the respective frames at least on the block basis in order to permit special reproduction of moving picture data. Thus, in case of varying speed reproduction in the reverse direction of the encoded data comprised of the forward predictive-coded pictures and bi-directionally predictive-coded pictures, optimum readout can be partially selected from the encoded data without causing disruption in data supply to the decoding means. Since only a minimum quantity of the encoded data for varying speed reproduction in the reverse direction can be transferred to the decoding means, the memory capacity in the decoding means may be suppressed to a minimum value.

The controller calculates the data quantity of the encoded data of the block unit using the header information, selects a pattern having a transfer rate slower than the decoding rate of the decoding means and transmits part or all of the encoded data of the block unit from the encoded data decoding means to the decoder. Since the size of the encoded data necessary for special constant-speed reproduction may be previously grasped in this manner, it becomes possible to optimize the decoding such as interpolation of pictures displayed by the decoder.

DESCRIPTION OF THE PREFERRED EMBODIMENTS

Figure 1:
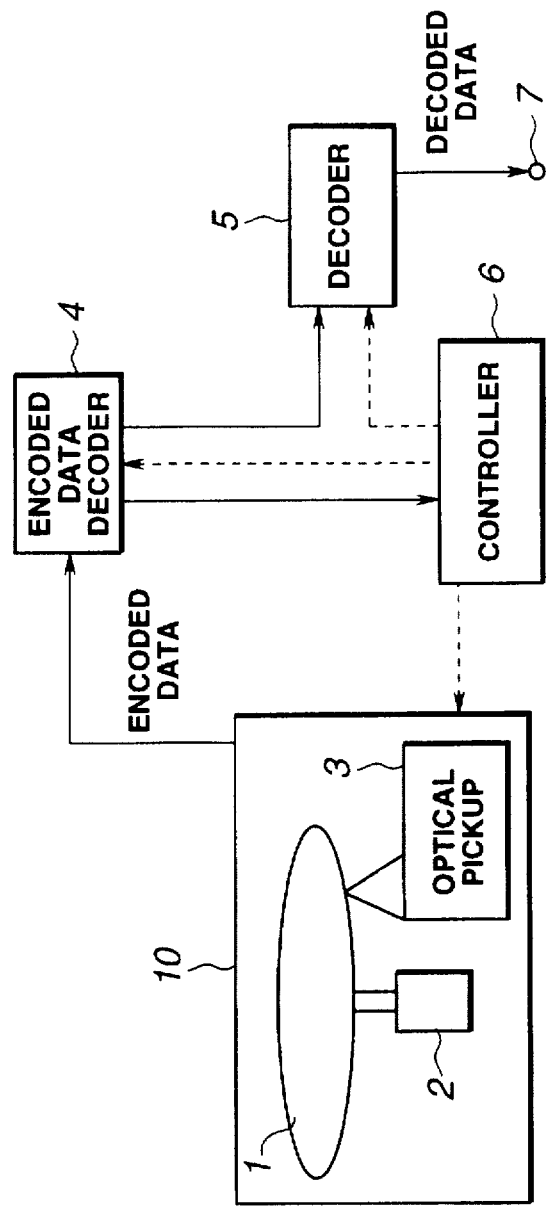
FIG. 1 schematically shows the construction of a data reproducing device according to the present invention.

Referring to the drawings, preferred embodiments of the present invention will be explained in detail. FIG. 1 schematically shows a construction of a data reproducing device according to the present invention.

The recording medium used in the present data reproducing device is a disc-shaped recording medium, specifically an optical disc, from which signals are optically reproduced.

The data reproducing device includes a signal readout unit 10 made up of an optical disc 1, a spindle motor 2 for running the optical disc 1 in rotation, and an optical pickup 3 for optically reading out the signals from the optical disc 1. The data reproducing device also includes an encoded data decoding unit 4 for decoding an encoded data string from the signal readout unit 10 and a decoder 5 for decoding frame-based encoded data. The data reproducing device also includes a controller 6 for controlling the signal readout unit 1, encoded data decoding unit 4 and the decoder 5.

On the optical disc 1 are recorded encoded data of respective frames of moving pictures in the form of intra-coded pictures (I-pictures), predictive-coded pictures (P-pictures) or bi-directionally coded pictures or B-pictures.

For data reproduction, the optical disc 1 within the signal readout unit 10 is run in rotation by the spindle motor 2 under control from the controller 6. The laser light radiated from laser outputting means, such as a laser diode of the optical pickup 3, is condensed and illuminated on the optical disc 1 and the laser light reflected from the optical disc 1 is received for reproducing the RF signals.

The RF signals are corrected for distortion and converted into bi-level signals so as to be corrected for errors and transmitted to the encoded data decoding unit 4 as encoded data.

The encoded data decoding unit 4 decodes the encoded data string from the signal readout unit 10 based upon the control signal from the controller 6.

The construction of the encoded data string sent to the encoding data decoding unit 4 is hereinafter explained by referring to FIG. 2.

Figure 2:
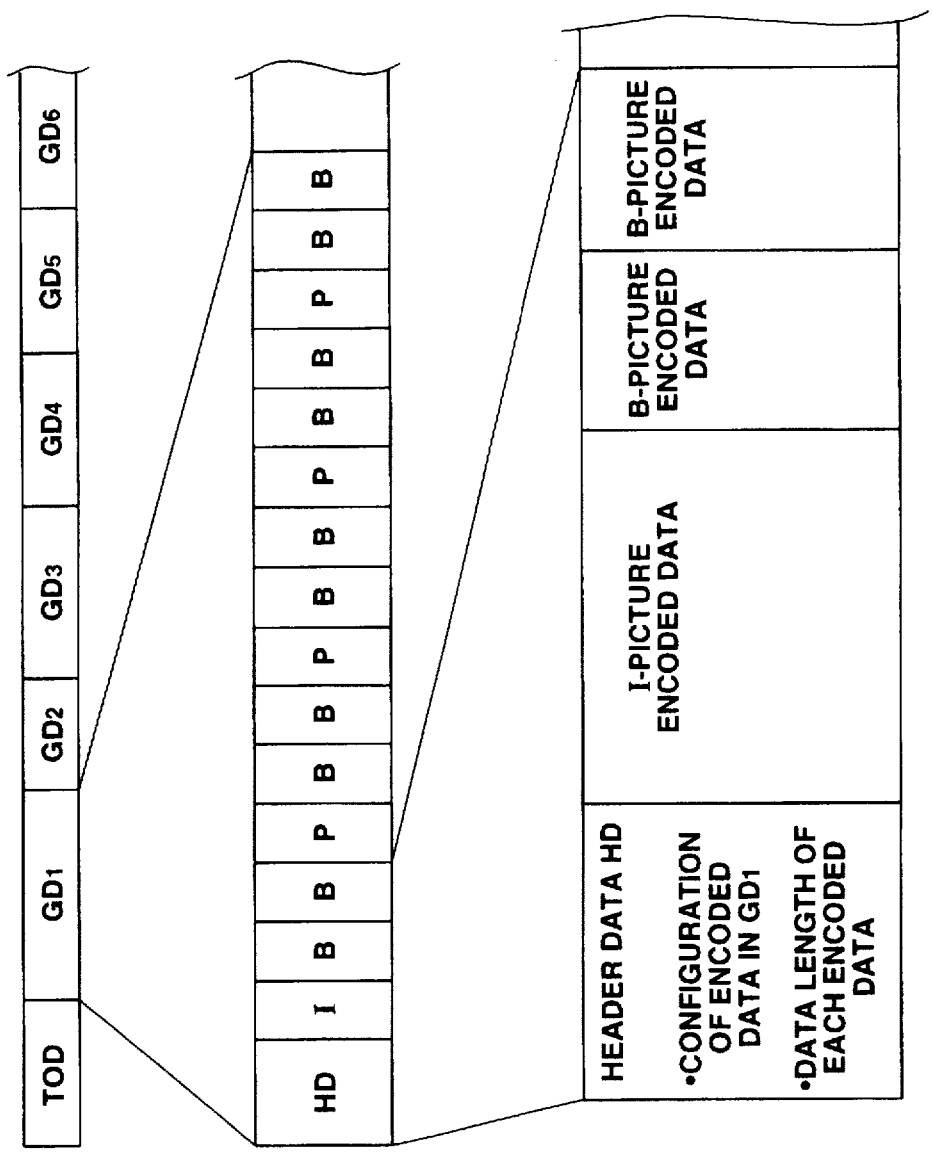
FIG. 2 is a diagrammatic view showing the construction of encoded data.

FIG. 2 shows, in its upper part, an encoded data string of the signal read out from the optical disc 1. The encoded data string is made up of an initial information area TOD and sets of pictures GD each consisting of plural pictures at least one of which is an I-picture. The initial information area TOD is an area containing various initializing data. In the initial information area TOD, there is recorded the address information of the sets of pictures GD which will be read in succession subsequently. The sets of pictures $GD_1$, $GD_2$, $GD_3$, ... can be directly accessed with the aid of the address information.

FIG. 2 shows, in its mid part, the construction of the set of pictures GD. The set of pictures GD is made up of header data HD and encoded data of plural pictures. FIG. 2 also shows, in its lower portion, that the encoding types and sequences and data lengths of the respective pictures included in the set of pictures GD covered by the header data HD, are recorded in the header data HD.

The encoded data decoding unit 4 routes to the controller 6 the information of the header data HD decoded from the encoded data string, while routing the encoded data of the respective pictures to the decoder 5. The controller 6 outputs control signals for decoding the respective pictures to the decoder 5 using the information of the header data HD supplied thereto. The decoder 5 then decodes the encoded data of the respective pictures for reproducing the picture signal. The reproduced picture signals are outputted via an output terminal 7 to an external display device, not shown.

Figure 3:
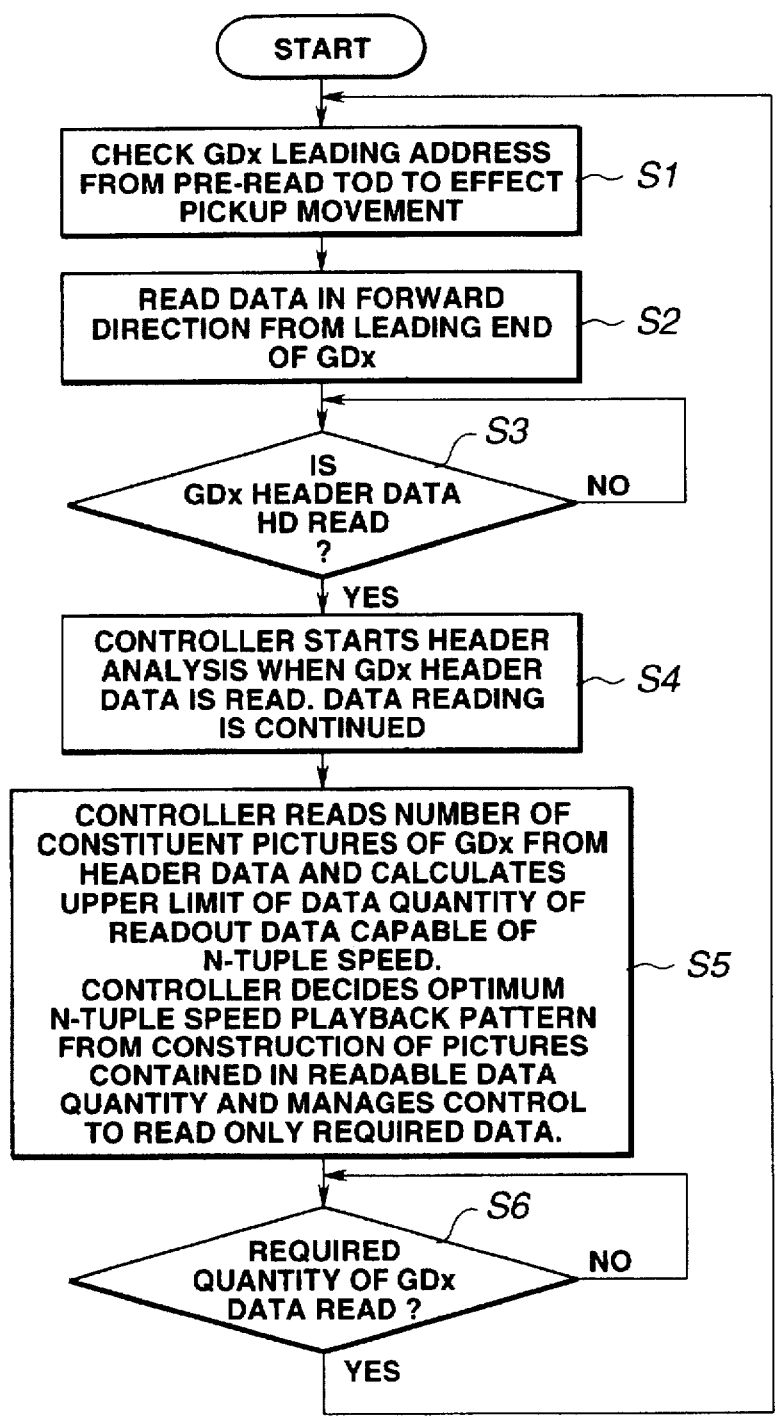
FIG. 3 is a flowchart for illustrating the data playback sequence in the data reproducing method according to the present invention.

Referring to the flowchart of FIG. 3, the playback sequence by the reproducing method according to the present invention will be explained in detail.

This flowchart shows the sequence of special reproduction of reproducing the X'th set of pictures $GD_{X3}$ in the reverse direction at a N-tuple speed, where X denotes an integer and N a natural number.

The information of the header data HD in each set of pictures GD is stored in the encoded data decoding unit 4 of FIG. 1. The controller 6 is able to take the information of the header data HD occasionally from the encoded data decoding unit 4.

In addition, the encoded data decoding unit 4 is able to count the read-out data quantity from each set of pictures GD or from a specified position and to set the quantity of the read-out data. This enables the controller 6 to cause an interrupt of the operation of the encoded data decoding unit 4 to relieve the load of the controller 6.

At step S1, the controller 6 has reference to pre-read data of the initial information area TOD to decide the value of the initial address of the X'th set of pictures $GD_X$. The controller 6 also outputs a movement control signal corresponding to the detected address value to the signal readout unit 10 for shifting the optical pickup 3 to the leading address of the set of pictures $GD_X$ on the optical disc 3.

At step S2, data of the set of pictures $GD_X$ is read forwardly from its leading end so as to be read into the encoded data decoding unit 4.

At step S3, it is judged whether or not the header data HD of the set of pictures $GD_X$ has been read in its entirety into the encoded data decoding unit 4. If the header data in its entirety is read in this manner, the program transfers to step S4 where the header data HD is sent to the controller 6 which then starts to analyze the header data. Data reading of the encoded picture data by the encoded data decoding unit 4 is continued at this time.

At step S5, the controller 6 reads out from the information of the header data HD the picture construction and the data lengths of the respective pictures of the set of pictures $GD_X$, while calculating the value of the upper limit of the data quantity that can be read on the occasion of the N-tuple speed data reproduction. The controller 6 also decides, from the construction of the pictures contained in the readable data quantity, the optimum readout pattern for N-tuple speed data reproduction, and outputs a control signal which will enable only the required data to be routed to the decoder 5. This causes the decoder 5 to start reading only of the required data among the data of the respective pictures stored in the encoded data deciding unit 4.

At step S6, the controller 6 decides whether or not the required data has been read out in its entirety. If the required data has been read in its entirety, the program returns to step S1 in order to start the control on the next set of pictures $GD_{X+1}$. It is noted that the processing in the controller 6 concerning the signal processing in the decoder 5, such as decoding, is carried out in parallel with the signal processing for steps S1 to S6.

The optimum readout patterns for the N-tuple speed data reproduction during processing at step S5 may be decided by various different methods, such as by laying several control models for the N-tuple speed data reproducing operations in store in the controller 6 and selecting an optimum one of the control models.

An illustrative sequence of performing special data reproduction of reproducing data of the first and second sets of pictures $GD_1$ and $GD_2$ in the reverse direction at the triple speed in the above-described data reproducing method is explained in detail.

Figure 4:
FIG. 4 illustrates an encoded codestring.
Figure 5:
FIG. 5 illustrates an encoded codestring displayed on triplespeed special reproduction in the reverse direction.

FIG. 4 shows an encoded data string of plural pictures or frames constituting the sets of pictures $GD_1$, $GD_2$. In FIG. 4, the numbers affixed to the respective pictures denote the display sequence of the respective frames.

Fie convenience in explanation, the pictures of the same types in the sets of pictures $GD_1$, $GD_2$ are assumed to have the same data quantity. Specifically, the I-, P- and B-pictures in the sets of pictures $GD_1$, $GD_2$ are assumed to have the respective data quantities shown in Table 1, and to be read into the decoder 5 within the readout time shown in Table 2.

TABLE 1

|   | $GD_1$ (kbytes) | $GD_2$ (kbytes) |
|---|---|---|
| I | 200 | 50 |
| P | 80 | 20 |
| B | 40 | 10 |

TABLE 2

|   | $GD_1$ (msec) | $GD_2$ (msec) |
|---|---|---|
| I | 80 | 20 |
| P | 32 | 8 |
| B | 16 | 4 |

If the possible multiple speed is N, the time required for usual playback of the set of pictures GD is M, and the data readout time is P, the possible multiple speed N is represented by the equation (1):

$$N = M/P \tag{1}$$

Thus, if the time required for usual reproduction of the set of pictures GD is 500 msec, the partial data readout pattern for the sets of pictures $GD_1$ and $GD_2$, the readout time of the readout patterns and the multiple speeds possible with the readout time, are as shown in Table 3:

TABLE 3

|  | GD$_1$ | | GD$_2$ | |
| --- | --- | --- | --- | --- |
| readout pattern | readout time in msec | multiple speed possible | readout time in msec | multiple speed possible |
| (a) I | 80 | 6.25 | 20 | 25 |
| (b) I, B, B, P | 144 | 3.47 | 36 | 13.8 |
| (c) I, B, B, P, B, B, P | 208 | 2.40 | 52 | 9.61 |
| (d) I, B, B, P, B, B, P, B, B, P | 272 | 1.83 | 68 | 7.35 |
| (e) I, B, B, P, B, B, P, B, B, P, B, B, P | 336 | 1.48 | 84 | 5.95 |
| (f) I, B, B, P, B, B, P, B, B, P, B, B, P, B, B | 400 | 1.25 | 100 | 5 |

In Table 3, the data seek time is not taken into consideration. The reason is that the gist of the present invention is to effect special adaptive data reproduction for special data reproduction by the controller 6 by analyzing the data quantity and the construction of pictures as the encoded data in the sets of pictures GD and by changing the data readout method and control in the decoder 5 based upon this analysis.

It is assumed that, for data reproduction in the reverse direction at a triple speed, picture display is to be made from the picture 30P within the set of pictures GD$_2$ towards the picture 1B within the set of pictures GD$_1$ at a mean display rate of one picture for three pictures.

As characteristic of the encoded data, the decoding and displaying sequence of the respective pictures in the sets of pictures GD are varied significantly.

That is, the I-picture is such a picture that can be decoded solely by data of the own data. The P-picture is such a picture that can be decoded using a sole temporally previous I-picture or P-picture. On the other hand, the B-picture is such a picture that can be decoded using two temporally previously decoded I-or P-pictures. It is noted that one of the two pictures required for decoding the B-picture is comprised of frame picture data displayed temporally subsequently to the B-picture.

For decoding e.g., the picture 25B in the sets of pictures GD$_2$, the pictures 24P and 27P need to be decoded previously, while the pictures 18I and 21P need to be decoded before decoding of the pictures 24P and 27P. That is, decoding and picture display need to be carried out insofar as there is no disorder produced in data transfer to the decoder 5.

The controller 6 refers to pre-read data in the initial information area TOD for deciding the value of the leading address of the set of pictures GD$_2$. The controller 6 also outputs a movement control signal derived from the address value to the signal readout unit 10 for shifting the optical pickup 3 to a leading address of the set of pictures GD$_2$ on the optical disc 1 for reading out the data of the set of pictures GD$_2$ from its leading end in the forward direction. The read-out data of the set of pictures GD$_2$ is sequentially routed to the encoded data decoding unit 4. The header data HD of the set of pictures GD$_2$, when read out, is sent to the controller 6. Based upon the information of the header data HD of the set of pictures GD$_2$, the controller 6 detects the data length of the set of pictures GD$_2$, the sorts and the number of the encoded data and calculates the readable quantity of data which will not produce disorder on the occasion of triple-speed reproduction.

Specifically, by employing the equation (1), it is decided that the encoded data can be read with the totality of the readout patterns of (a) to (f) in Table 3. Thus the controller 6 selects the read-out pattern (f) which will enable all of the encoded data to be read and which will enable the frame pictures to be displayed at an equal interval, and accordingly controls the decoder 5. This causes all of the encoded data of the set of pictures GD$_2$ to be transferred from the encoded data decoding unit 4 to the decoder 5. The encoded data, thus transferred to the decoder 5, is decoded, such that the encoded data of the information of the respective frames of the pictures 30P, 27P, 24P, 21P and 18I is decoded and the frame pictures are displayed at equal intervals in the reverse direction.

The similar operation is carried out for the set of pictures GD$_1$. That is, the controller 6 calculates the readable quantity of data, based upon the information of the header data HD of the set of pictures GD$_1$, and decides that the read-out patterns of Table 3 (a) or (b) can be read. Thus the controller 6 selects the readout pattern (b) which will enable the frame picture data of plural pictures to be displayed, and accordingly controls the decoder 5. This causes the encoded data of the information of the frame pictures of the pictures 3I, 1B, 2B and 6P to be transferred from the encoded data decoding unit 4 to the decoder 5. The encoded data transferred to the decoder 5 is decoded and the frame pictures of the picture 6P are displayed twice on end, while the frame pictures of the picture 3I are displayed thrice on end.

What is claimed is:

1. A data reproducing apparatus, comprising:

read-out means for reading a sequence of header information and encoded data representing a set of pictures succeeding said header information from a recording medium, wherein said header information and said encoded data are groused together as a unit and said header information is uniquely associated with said encoded data succeeding said header information;

analyze means for analyzing said header information;

control means for controlling said readout means to read said encoded data in response to the output from said analyze means and data reproducing condition to generate read-out encoded data;

decoding means for decoding the read-out encoded data to generate decoded data; and outputting means for outputting the decoded data;

the control means further comprising:

first decision means for determining the encoded data to be read out in accordance with the data reproducing rate and/or data reproducing direction, said first decision means including means for producing the readable data quantity in accordance with the data reproducing rate and/or reproducing direction;

second decision means for determining the encoded data to be read out in accordance with the readable data quantity, the second decision means including detection means for detecting the sorts and the quantity of the encoded data from the header information to provide a detection output; and third decision means for determining the encoded data to be read out from the readable data responsive to said detection output.

2. The data reproducing apparatus as claimed in claim 1 wherein the third decision means includes storage means for storing plural encoded data readout patterns; and selection means for selecting one of said readout patterns responsive to the detection output of said detection means.

3. The data reproducing apparatus as claimed in claim 1 wherein the decoding means selectively decodes the intra-picture encoded data and the forward predictive-coded data.

4. A data reproducing method, comprising the steps of:

reading a sequence of header information and encoded data representing a set of pictures succeeding said header information from a recording medium, wherein said header information and said encoded data are grouped together as a unit and said header information is uniquely associated with said encoded data succeeding said header information;

analyzing said header information to generate analyzed data;

controlling the reading of said encoded data in response to said analyzed data and data reproducing condition to generate read-out encoded data;

determining the encoded data to be read out in accordance with the data reproducing rate and/or data reproducing direction producing the readable data quantity in accordance with the data reproducing rate and/or data reproducing direction;

determining the encoded data to be read out in accordance with the readable data quantity;

detecting the sorts and the quantity of the encoded data from the header information to provide a detection output;

determining the encoded data to be read out from the readable data responsive to said detection output;

decoding the read-out encoded data to generate decoded data; and outputting the decoded data.

5. The data reproducing method as claimed in claim 4 wherein the step of determining the encoded data to be read out from the readable data includes selecting one of pre-stored read-out patterns responsive to said detection output.

6. The data reproducing method as claimed in claim 4 wherein the step of decoding includes selecting the intra-picture coded data and the forward predictive-coded data to be decoded.

* * * * *